(12) United States Patent
Lee et al.

(10) Patent No.: US 10,287,946 B2
(45) Date of Patent: May 14, 2019

(54) EXHAUST SYSTEM AND CONTROL METHOD OF AMOUNT OF UREA SUPPLY

(71) Applicant: HYUNDAI MOTOR COMPANY, Seoul (KR)

(72) Inventors: Hyokyung Lee, Anyang-si (KR); Chang Hwan Kim, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 49 days.

(21) Appl. No.: 15/360,246

(22) Filed: Nov. 23, 2016

(65) Prior Publication Data
US 2017/0342884 A1    Nov. 30, 2017

(30) Foreign Application Priority Data
May 25, 2016 (KR) .................. 10-2016-0064380

(51) Int. Cl.
*F01N 3/08* (2006.01)
*F01N 3/20* (2006.01)
(Continued)

(52) U.S. Cl.
CPC ......... *F01N 3/208* (2013.01); *B01D 53/9418* (2013.01); *F01N 3/035* (2013.01); *F01N 3/0814* (2013.01); *F01N 3/0842* (2013.01); *F01N 9/00* (2013.01); *F01N 13/009* (2014.06); *F01N 13/0093* (2014.06); *B01D 2255/2073* (2013.01); *B01D 2255/20738* (2013.01); *B01D 2255/20761* (2013.01); *B01D 2255/50* (2013.01);
(Continued)

(58) Field of Classification Search
CPC ...... F01N 3/035; F01N 3/0814; F01N 3/0842; F01N 3/208; F01N 9/00; F01N 13/009; F01N 13/0093; F01N 2370/00; F01N 2610/02; F01N 2610/1453; F01N 2900/1411; F01N 2900/1602; F01N 2900/1615; B01D 53/9418; B01D 2255/2073; B01D 2255/20738; B01D 2255/20761; B01D 2255/50
See application file for complete search history.

(56) References Cited

U.S. PATENT DOCUMENTS

| 8,109,077 B2 | 2/2012 | Reba et al. |
| 2010/0236224 A1 | 9/2010 | Kumar et al. |
| 2016/0084185 A1* | 3/2016 | Theis ................ F02D 41/064 |
| | | 701/105 |

FOREIGN PATENT DOCUMENTS

| JP | 2009-517210 A | 4/2009 |
| JP | 5316266 B2 | 10/2013 |

(Continued)

*Primary Examiner* — Audrey K Bradley
(74) *Attorney, Agent, or Firm* — Morgan Lewis & Bockius LLP (57) ABSTRACT

An exhaust system according to an exemplary embodiment of the present invention includes a nitrogen oxide storing catalytic collector connected to an exhaust line and collecting a nitrogen oxide included an exhaust gas in a first temperature or less; a first selective catalytic reducer disposed at a rear portion of the nitrogen oxide storing catalytic collector and reducing a nitrogen oxide included in the exhaust gas; and a first urea injector disposed at the front side of the nitrogen oxide storing catalytic collector and supplying a urea solution when a temperature of the nitrogen oxide exceeds the first temperature.

7 Claims, 4 Drawing Sheets

(51) Int. Cl.
*F01N 9/00* (2006.01)
*F01N 13/00* (2010.01)
*B01D 53/94* (2006.01)
*F01N 3/035* (2006.01)

(52) U.S. Cl.
CPC ...... *F01N 2370/00* (2013.01); *F01N 2610/02* (2013.01); *F01N 2610/1453* (2013.01); *F01N 2900/1411* (2013.01); *F01N 2900/1602* (2013.01); *F01N 2900/1614* (2013.01)

(56) References Cited

FOREIGN PATENT DOCUMENTS

| | | |
|---|---|---|
| KR | 10-2009-0082225 A | 7/2009 |
| KR | 10-2014-0011043 A | 1/2014 |

\* cited by examiner

EXHAUST SYSTEM AND CONTROL METHOD OF AMOUNT OF UREA SUPPLY

CROSS-REFERENCE TO RELATED APPLICATION

This application claims the benefit of priority to Korean Patent Application No. 10-2016-0064380 filed in the Korean Intellectual Property Office on May 25, 2016, the entire content of which is incorporated herein by reference.

TECHNICAL FIELD

The present disclosure relates to an exhaust system and a control method of an amount of a urea supply. More particularly, the present disclosure relates to an exhaust system having a selective catalytic reduction device purifying a nitrogen oxide by using a reducing agent and a control method of an amount of a urea supply.

BACKGROUND

Generally, exhaust gas that is exhausted through an exhaust manifold of an engine is induced to pass through a catalytic converter that is mounted in the middle of an exhaust pipe to be purified, and noise thereof is reduced while passing through a muffler before the exhaust gas is discharged to outside through a tail pipe.

The catalytic converter processes pollution materials that are included in the exhaust gas. Further, a particulate filter is mounted on the exhaust pipe to trap a particulate material (PM) that is included in the exhaust gas.

A selective catalytic reduction device is a type of catalytic converter. Reducing agents such as carbon monoxide, total hydrocarbon (THC), and so on react well with nitrogen oxide rather than oxygen in the selective catalyst reduction apparatus (SCR).

In a case of an internal combustion engine to which the selective catalyst reduction apparatus is installed, in a normal driving mode of a diesel engine with oxygen, a nitrogen oxide exhausted from the engine and ammonia generated by a urea directly injected and supplied to the exhaust pipe are selectively reacted such that the nitrogen oxide is converted into a harmless nitrogen ($N_2$) and then is removed.

However, an exhaust gas temperature must be 180 degrees (° C.) or more to be converted into ammonia in a urea solution. Accordingly, the exhaust gas temperature is low during an initial cold start and an urban driving, urea can be not injected and purification of the nitrogen oxide is impossible.

To ensure the activation of the selective catalytic reduction in a low temperature, a demand amount of the urea is high, in the case less than 250 degrees, since ammonia stored in the selective catalytic reduction is slipped in atmosphere after being attached or detached as the exhaust gas temperature increases, a urea injection amount is restricted such that performance of the selective catalytic reduction device is deteriorated.

The above information disclosed in this Background section is only for enhancement of understanding of the background of the invention, and therefore, it may contain information that does not form the prior art that is already known in this country to a person of ordinary skill in the art.

SUMMARY

The present disclosure provides an exhaust system and a control method of an amount of a urea supply improved with a purify efficiency of nitrogen oxide by installing a urea injector to the exhaust line and controlling injection of the urea and the selective catalytic reduction depending on a temperature region.

An exhaust system according to an exemplary embodiment in the present disclosure includes a nitrogen oxide storing catalytic collector connected to an exhaust line and collecting a nitrogen oxide included an exhaust gas in a first temperature or less; a first selective catalytic reducer disposed at a rear portion of the nitrogen oxide storing catalytic collector and reducing a nitrogen oxide included in the exhaust gas; and a first urea injector disposed at a front portion of the nitrogen oxide storing catalytic collector and supplying a urea solution when a temperature of the nitrogen oxide exceeds the first temperature.

The exhaust system may further include a second selective catalytic reducer disposed at a rear portion of the first selective catalytic reducer and reducing the nitrogen oxide included in the exhaust gas.

The exhaust system may further include a second urea injector disposed between the first selective catalytic reducer and the second selective catalytic reducer and supplying the urea solution to the exhaust line when the temperature of the nitrogen oxide exceeding a second temperature.

The first selective catalytic reducer may include a low temperature selective catalytic reduction catalyst activated in the second temperature or less, and the second selective catalytic reducer may include a high temperature selective catalytic reduction catalyst activated when exceeding the second temperature.

The first temperature may be about 300 degrees (° C.).

The second temperature may be about 500 degrees (° C.).

The low temperature selective catalytic reduction catalyst may include a component of zeolite and copper (Cu).

The high temperature selective catalytic reduction catalyst may include one component of zeolite and iron (Fe) or manganese (Mn).

The nitrogen oxide storing catalytic collector may collect the nitrogen oxide in the temperature of 0 degree or more and 200 degrees or less.

The low temperature selective catalytic reduction may be activated in the temperature of the first temperature or more and the second temperature or less.

The high temperature selective catalytic reduction catalyst may be activated in the temperature of 400 degrees or more.

A control method of a urea supply amount according to another exemplary embodiment in the present disclosure includes: measuring an amount of a nitrogen oxide exhausted from an engine and supplied to a front side of a nitrogen oxide storing catalytic collector; measuring an amount of the nitrogen oxide supplied to a front side of the selective catalytic reducer; calculating an ammonia demand amount for removing the nitrogen oxide supplied at the front of the selective catalytic reducer by using the amount of the nitrogen oxide supplied at the front side of the nitrogen oxide storing catalytic collector, the amount of the nitrogen oxide supplied at the front side of the selective catalytic reducer, a storing efficiency stored in a nitrogen oxide storing efficiency map, and a detach efficiency stored in a nitrogen oxide detach efficiency map; calculating a urea injection amount by using the ammonia demand amount for removing the nitrogen oxide supplied at the front side of the selective catalytic reducer, a purify efficiency stored in the nitrogen oxide purify efficiency map, and an ammonia storing control value in the selective catalytic reducer.

The storing efficiency stored to the nitrogen oxide storing efficiency map may be a value that is pre-calculated for the nitrogen oxide storing catalytic temperature, an exhaust flow amount, and a nitrogen oxide storage amount data accumulated to a current nitrogen oxide storing catalytic.

The detach efficiency stored to the nitrogen oxide detach efficiency map may be a value that is pre-calculated for the nitrogen oxide storing catalytic temperature and the exhaust flow amount.

The ammonia demand amount for removing the nitrogen oxide supplied at the front of the selective catalytic reducer may be calculated by applying a stoichiometric rate of ammonia for the nitrogen oxide.

The stoichiometric rate of ammonia for the nitrogen oxide may be a value that is pre-calculated by applying a selective catalytic reduction temperature, nitrogen dioxide, and the nitrogen oxide.

The purify efficiency stored to the nitrogen oxide purify efficiency map may be a value that is pre-calculated for an ammonia cumulative storage amount, an exhaust flow amount, a rate of nitrogen dioxide for nitrogen oxide, and a catalytic temperature.

The ammonia storing control value in the selective catalytic reducer may be calculated by subtracting the current ammonia cumulative storage amount from an ammonia target storage amount in the selective catalytic reducer.

According to the exemplary embodiment in the present disclosure, the injection of the urea and the selective catalytic reduction may be controlled according to the temperature such that the purify efficiency of the nitrogen oxide of the exhaust gas may be improved.

DETAILED DESCRIPTION OF THE EMBODIMENTS

The present disclosure will be described more fully hereinafter with reference to the accompanying drawings, in which exemplary embodiments are shown. As those skilled in the art would realize, the described embodiments may be modified in various different ways, all without departing from the spirit or scope of the present disclosure.

Further, in exemplary embodiments, since like reference numerals designate like elements having the same configuration, a first exemplary embodiment is representatively described, and in other exemplary embodiments, only different configurations from the first exemplary embodiment will be described.

The drawings are schematic and are not illustrated in accordance with a scale. The relative sizes and ratios of the parts in the drawings are exaggerated or reduced for clarity and convenience, and the arbitrary sizes are only exemplary and are not limiting. The same structures, elements, or parts illustrated in no less than two drawings are denoted by the same reference numerals in order to represent similar characteristics. When a part is referred to as being "on" another part, it can be directly on the other part or intervening parts may also be present.

Exemplary embodiments in the present disclosure are illustrated in detail. As a result, various modifications are expected to be made. Therefore, the exemplary embodiments are not limited to a specific shape of an illustrated region, but, for example, include changes in shape in accordance with manufacturing.

Now, an exhaust system according to an exemplary embodiment in the present disclosure will be described with reference to FIG. 1.

Figure 1:
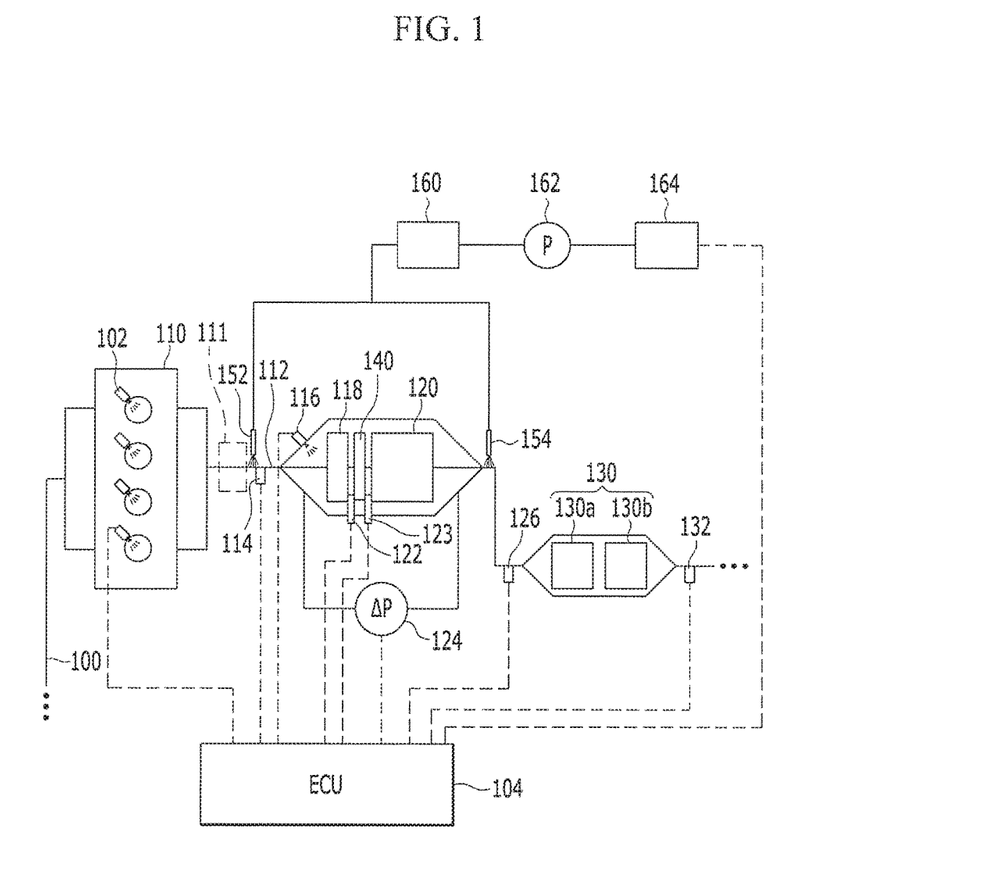
FIG. 1 is a schematic view showing an exhaust system according to an exemplary embodiment in the present disclosure.

FIG. 1 is a schematic view showing an exhaust system according to an exemplary embodiment in the present disclosure. Referring to FIG. 1, the exhaust system includes an engine 110, an exhaust line 112, a first selective catalytic reduction device 140, a second selective catalytic reduction device 130, a fuel injector 102, a nitrogen oxide storing catalytic device 118, a first urea injector 152, a second urea injector 154, and a controller 104.

Combustion air is supplied to an intake line, and the first injector 102 that is mounted in the engine 100 injects gasoline or diesel fuel into a cylinder. In the present disclosure, the air and fuel are mixed within the intake manifold of the intake line to be supplied.

The combusted exhaust gas in the cylinder of the engine 110 is exhausted outside through the exhaust line 112, the turbocharger 111 (e.g., turbine) is disposed at the exhaust line at the rear of the engine 110, and the turbocharger 111 is connected to the intake line to supercharge the air into the engine.

The second fuel injector 116, the nitrogen oxide storing catalytic device 118, the first selective catalytic reduction device 140, and the catalytic particulate filter 120 are sequentially disposed into the rear of the turbocharger 111 in the exhaust line 112, the first temperature sensor 114 is disposed between the turbocharger 111 and the second fuel injector 116, the second temperature sensor 122 is disposed between the nitrogen oxide storing catalytic device 118 and the first selective catalytic reduction device 140, and the third temperature sensor 123 is disposed between the first selective catalytic reduction device 140 and the catalytic particulate filter 120.

The differential pressure sensor 124 detects the pressure differential between the front and rear of the catalyzed particulate filter 120 to transfer a signal thereof to the controller (ECU, 104).

The nitrogen oxide storing catalytic device 118 is installed at the exhaust line 112 to collect the nitrogen oxide included in the exhaust gas at a temperature below a first temperature. The nitrogen oxide storing catalytic device 118 stores the nitrogen oxide exhausted from the engine at the low temperature, in this case, the first temperature may be about 300 degrees (° C.).

The first selective catalytic reduction device 140 is installed at the exhaust line 112 of the rear of the nitrogen oxide storing catalytic device 118 to reduce the nitrogen oxide included in the exhaust gas.

The second selective catalytic reduction device 130 installed at the rear of the first selective catalytic reduction device 140 to reduce the nitrogen oxide included in the exhaust gas may be further included. The second urea injector 154 installed between the first selective catalytic reduction device 140 and the second selective catalytic reduction device 130 and supplying a urea solution to the exhaust line 112 when exceeding a second temperature may be further included.

The second selective catalytic reduction device 130 may be installed at the exhaust line 112 of the rear of the first selective catalytic reduction device 140 to reduce the nitrogen oxide included in the exhaust gas.

The first selective catalytic reduction device 140 may include a low temperature selective catalytic reduction activated in the second temperature or less, and the second selective catalytic reduction device 130 may include a high temperature selective catalytic reduction activated when exceeding the second temperature. In this case, the second temperature may be about 500 degrees (° C.). The low temperature selective catalytic reduction catalyst may include the component of zeolite and copper (Cu), and the high temperature selective catalytic reduction catalyst may include one component of zeolite and iron (Fe) or manganese (Mn).

On the other hand, the first temperature and the second temperature may be changed depending on the components of the low temperature and high temperature selective catalytic reductions.

The fourth temperature sensor 126 is disposed at the front of the second selective catalytic reduction device 130 and the fifth temperature sensor 132 and a nitrogen oxide detecting sensor (not shown) may be disposed at the rear. The first, second, third, fourth, and fifth temperature sensors 114, 122, 123, 126, and 132 sense the temperature of the exhaust gas passing through them, and the nitrogen oxide sensor sense the amount of the nitrogen oxide included in the exhaust gas.

The catalytic particulate filter 120 connects particulate materials (PM) included in the exhaust gas and removes them at a predetermined condition.

When the pressure difference measured from the differential pressure sensor 124 is a predetermined value or more, the controller 104 may be controlled to regenerate the catalytic particulate filter 120. In this case, by post-injecting the fuel from the fuel injector 102 or the second fuel injector 116, a soot collected in the catalytic particulate filter 120 may be combusted.

The second fuel injector 116 secondary injects the fuel in the exhaust line 112 depending on the control of the controller 104. Particularly, in a condition that the temperature of the exhaust gas is more than 200° C. and an evaporation of the fuel is possible, the fuel is injected.

A ratio of hydrocarbon (HC) in the nitrogen oxide and the exhaust gas stored in the second selective catalytic reduction device 130 is set in a map data, the controller 104 compares the ratio of HC for the nitrogen oxide in the actual driving condition and the predetermined value in the map data, when the value of the ratio is less than the predetermined value, the controller 104 operates the second fuel injector 116 to additionally inject the fuel in the exhaust gas.

A nitrogen oxide detecting sensor may be provided at the rear of the second selective catalytic reduction device 130, and the nitrogen oxide detecting sensor may detect the amount of the nitrogen oxide in the exhaust gas and may transmit the signal thereof to the controller 104. On the other hand, instead of the nitrogen oxide detecting sensor, it may predict the storage amount of the nitrogen oxide from a map determined by an experiment value.

As the controller 104 controls the additional injection amount and the additional injection timing of the fuel based on the signals detected from the sensors and the map data, the nitrogen oxide of the second selective catalytic reduction device 130 is detached to be removed.

The second selective catalytic reduction device 130 includes a first catalytic 130a and a second catalytic 130b, the second catalytic 130b is disposed at the rear of the first catalytic 130a by a predetermined interval. In a certain embodiment, the first catalytic 130a may reinforce a heat-resistance and the second catalytic 130b may reinforce a hydrocarbon reduction characteristic On the other hand, the first urea injector 152 is disposed between the turbocharger 111 and the first temperature sensor 114 to supply the urea solution when exceeding the first temperature, and the second urea injector 154 is disposed between the catalytic particulate filter 120 and the fourth temperature sensor 126 to supply the urea solution when exceeding the second temperature. The first urea injector 152 and the second urea injector 154 inject the urea solution to the exhaust line 112.

The amount of the urea solution injected from the first urea injector 152 and the second urea injector 154 are controlled by the controller 104 transmitted with the signals of each sensors. The urea solution becomes ammonia by a thermal decomposition, thereby reducing the nitrogen oxide in the selective catalytic reduction devices 140 and 130.

The first, second, third, fourth, and fifth temperature sensors 114, 122, 123, 126, and 132 sense the temperature of the exhaust gas passing through the exhaust line 112, in the low temperature region less than about 200 degrees, the nitrogen oxide storing catalytic device 118 stores the nitrogen oxide, in the temperature more than about 200 degrees and less than about 500 degrees, the first selective catalytic reduction device 140 supplies the low temperature selective catalytic reduction to the exhaust line 112. In this case, the urea is injected from the first urea injector 152 to the exhaust line 112.

Further, in the high temperature region more than about 500 degrees, the exhaust gas is supplied from the second selective catalytic reduction device 130 to the high temperature selective catalytic reduction, and the second urea injector 154 injects the urea solution to the exhaust line 112.

On the other hand, the first urea injector 152 and the second urea injector 154 are connected with a regulator 160 controlling a supply amount of the urea solution, a pump 162 connected with the regulator 160 and transmitting the urea solution to the regulator 160, and a urea storage 164 connected with the pump 162 and storing the urea solution. Further, the regulator 160, the pump 162, and the urea storage 164 are connected with the controller 104 to control the supply of the urea solution in conjunction with the signals of the first, second, third, fourth, and fifth temperature sensors 114, 122, 123, 126, and 132.

Figure 2:
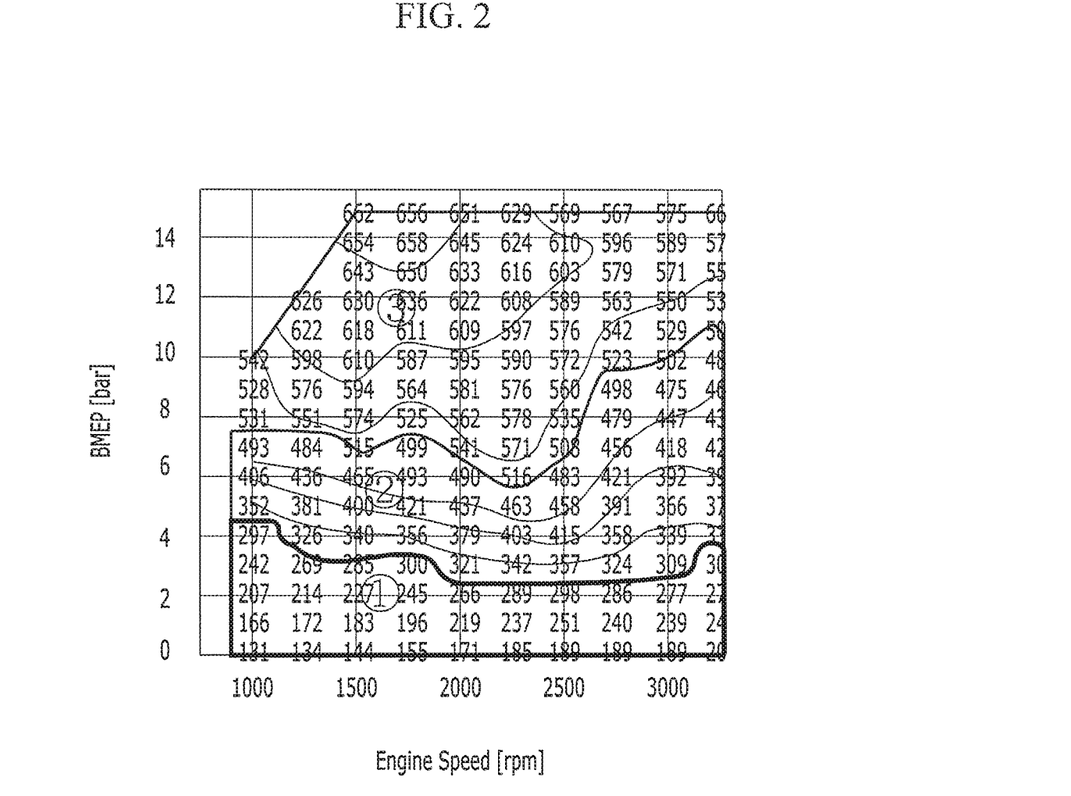
FIG. 2 is a graph showing a break average effective pressure depending on an engine speed and a front end temperature of a front turbocharger according to an exemplary embodiment in the present disclosure.

FIG. 2 is a graph showing a break average effective pressure depending on an engine speed and a front end temperature of a front end turbocharger according to an exemplary embodiment in the present disclosure.

Referring to FIG. 2, in a region (a region '①') that the exhaust gas temperature of the front of the turbocharger 111 is about 300 degrees or less and the break average effective pressure is about 4.5 bar or less, the nitrogen oxide storing catalytic device 118 stores the nitrogen oxide, and the nitrogen oxide detached due the increasing of the temperature is purified by the urea solution injected from the first urea injector 152 through the first selective catalytic reduction device 140.

In a region (a region '②') that the exhaust gas temperature of the front of the turbocharger 111 is more than about 300 degrees and less than about 500 degrees and the break average effective pressure is more than about 4.5 bar and less than about 11 bar, the exhaust gas temperature is ensured such that the first selective catalytic reduction device 140 sufficiently activated. Further, the urea solution injected from the first urea injector 152 is excessively injected such that ammonia slipped from the first selective catalytic reduction device 140 is again stored to the second selective catalytic reduction device 130 of the rear and the purify of the nitrogen oxide is additionally possible.

In a region (a region '③') that the exhaust gas temperature of the front of the turbocharger 111 is the high temperature more than about 500 degrees and the break average effective pressure is about 6 bar or more, ammonia due to the urea solution injected from the first urea injector 152 is oxidized in the nitrogen oxide storing catalytic device 118 such that the nitrogen oxide purify performance is improved by using the urea solution injected from the second selective catalytic reduction device 130 and the second urea injector 154.

Figure 3:
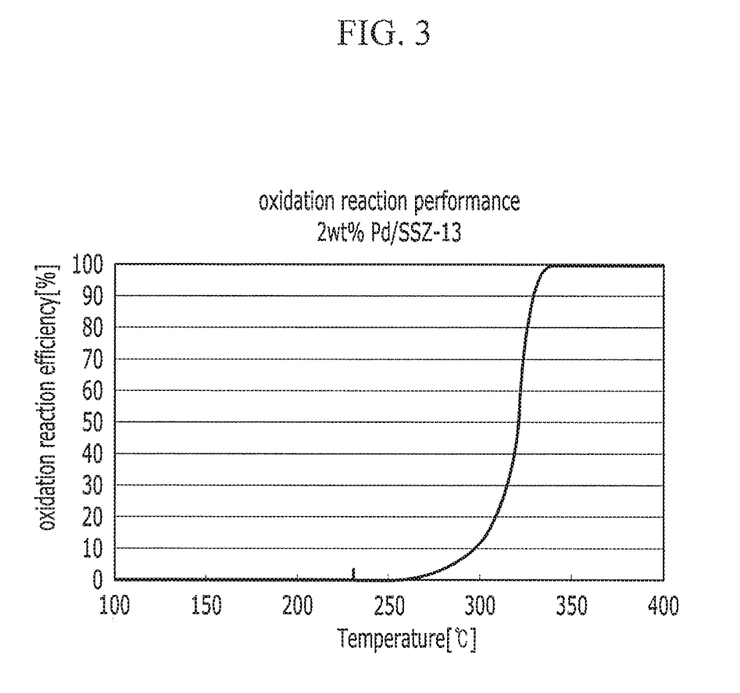
FIG. 3 is a graph showing an ammonia oxidation reaction performance depending on a temperature according to an exemplary embodiment in the present disclosure.

FIG. 3 is a graph showing an ammonia oxidation reaction performance depending on a temperature according to an exemplary embodiment in the present disclosure. Referring to FIG. 3, when the exhaust gas temperature as less than about 250 degrees is low, it may be confirmed that the ammonia oxidation reaction efficiency is converged to almost zero. In the case of the high temperature more than 250 degrees, it may be confirmed that the ammonia oxidation reaction efficiency is rapidly increased.

By considering the above ammonia oxidation reaction characteristic, in the low temperature region that the urea injection is impossible as the temperature less than about 300 degrees, the urea solution is injected to the exhaust line 112, the nitrogen oxide is stored in the nitrogen oxide storing catalytic device 118, and the low temperature selective oxidation catalytic is supplied to purify the nitrogen oxide.

Figure 4:
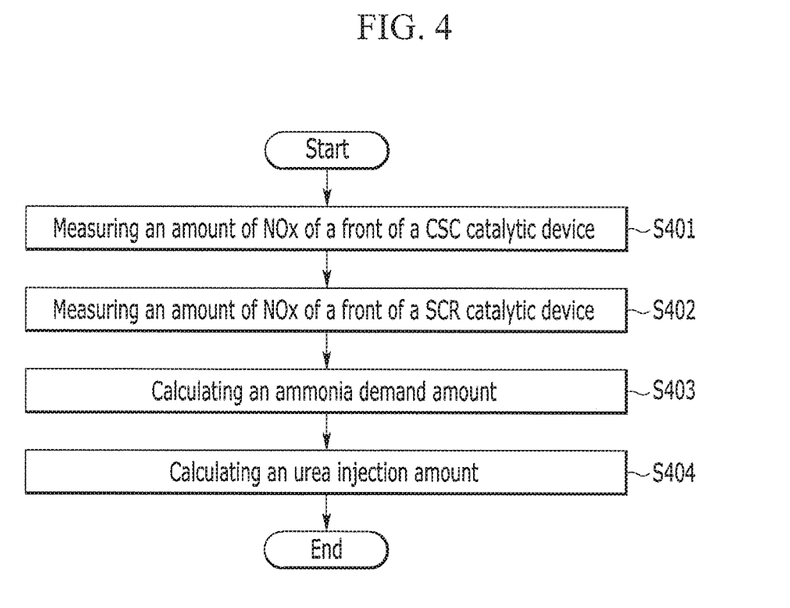
FIG. 4 is a flowchart showing a control method of a amount of urea supply according to an exemplary embodiment in the present disclosure.

FIG. 4 is a flowchart showing a control method of amount of urea supply according to an exemplary embodiment in the present disclosure.

Referring to FIG. 1 and FIG. 4, in the control method of an amount of the urea supply, firstly, the amount of the nitrogen oxide exhausted from the engine 110 and supplied to the front of the nitrogen oxide storing catalytic device 118 is measured (S401).

The amount of the nitrogen oxide supplied to the front of the selective catalytic reduction device 140 is measured (S402).

Next, an ammonia demand amount for removing the nitrogen oxide supplied to the front of the selective catalytic reduction device 140 is calculated by using the amount of the nitrogen oxide supplied to the front of the nitrogen oxide storing catalytic device 118, the amount of the nitrogen oxide supplied to the front of the selective catalytic reduction device 140, a storing efficiency stored to a nitrogen oxide storing efficiency map, and a nitrogen oxide detach efficiency map (S403).

Next, a urea injection amount is calculated by using the ammonia demand amount for removing the nitrogen oxide supplied to the front of the selective catalytic reduction device 140, a purify efficiency stored to the nitrogen oxide purify efficiency map and an ammonia storing control value inside the selective catalytic reduction device 140 (S404).

The step (S403) of calculating the ammonia demand amount for removing the nitrogen oxide supplied to the front of the selective catalytic reduction device 140 is realized as follows.

Firstly, a value A is calculated by multiplying the storing efficiency stored to the nitrogen oxide storing efficiency map to the measured amount of the nitrogen oxide supplied to the front of the nitrogen oxide storing catalytic collector 118. The storing efficiency stored to the nitrogen oxide storing efficiency map is a value that is pre-calculated for a data of a temperature of the nitrogen oxide storing catalytic, an exhaust flow amount and a nitrogen oxide storage amount accumulated to the nitrogen oxide storing catalytic.

Next, a value B is calculated by multiplying the detach efficiency stored to the nitrogen oxide detach efficiency map to the amount of the nitrogen oxide supplied to the front of the nitrogen oxide storing catalytic device 118. The detach efficiency stored to the nitrogen oxide detach efficiency map is a value that is pre-calculated for the nitrogen oxide storing catalytic temperature and the exhaust flow amount.

Next, the value A is subtracted from the amount of the nitrogen oxide supplied to the front of the selective catalytic reduction device 140 and the value B is added to calculate a value C.

Next, a stoichiometric ratio of ammonia for the nitrogen oxide is multiplied to the value C to calculate a value D of the ammonia demand amount for removing the nitrogen oxide supplied to the front of the selective catalytic reduction device 140.

The purify efficiency stored to the nitrogen oxide purify efficiency map is then multiplied to the value D to calculate a value E. The purify efficiency stored to the nitrogen oxide purify efficiency map may be a value that is pre-calculated for the ammonia cumulative storage amount, the exhaust flow amount, a nitrogen dioxide ratio for the nitrogen oxide, and the catalytic temperature.

Next, the ammonia storing control value inside the selective catalytic reduction device 140 is added to the value E to calculate a value F of the ammonia required amount. The ammonia storing control value inside the selective catalytic reduction device 140 may be calculated by subtracting a current ammonia cumulative storage amount from a ammonia target storage amount inside the selective catalytic reduction device 140.

Next, the value F is multiplied to the ratio of a urea molecular weight for ammonia and a urea mass fraction in the urea solution is divided to calculate a value G of the urea injection amount.

As described above, according to the exemplary embodiment, the exhaust system improved with the purify efficiency of the nitrogen oxide by installing the urea injector the exhaust line and by controlling the injection of the urea and the selective catalytic reduction according to the temperature region is provided.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A control method of a urea supply amount, the method comprising:
    measuring, by a controller, an amount of a nitrogen oxide exhausted from an engine and supplied to a front side of a nitrogen oxide storing catalytic collector;
    measuring, by the controller, an amount of the nitrogen oxide supplied to a front side of a selective catalytic reducer;
    calculating, by the controller, an ammonia demand amount for removing the nitrogen oxide supplied to the front side of the selective catalytic reducer by using the amount of the nitrogen oxide supplied to the front side of the nitrogen oxide storing catalytic collector, the amount of the nitrogen oxide supplied to a front side of the selective catalytic reducer, a storing efficiency stored, in advance, in a nitrogen oxide storing efficiency map for the nitrogen oxide storing catalytic collector, and a detach efficiency stored, in advance, in a nitrogen oxide detach efficiency map for the nitrogen oxide storing catalytic collector; and calculating, by the controller, a urea injection amount by using the ammonia demand amount for removing the nitrogen oxide supplied to the front side of the selective catalytic reducer, a purify efficiency stored in a nitrogen oxide purify efficiency map, and an ammonia storing control value of the selective catalytic reducer, wherein the calculated urea injection amount is injected upstream of the selective catalytic reducer.

2. The control method of claim 1, wherein:
the storing efficiency stored in the nitrogen oxide storing efficiency map is a value that is pre-calculated for a nitrogen oxide storing catalytic temperature, an exhaust flow amount, and a nitrogen oxide storage amount data accumulated in the nitrogen oxide storing catalytic collector.

3. The control method of claim 1, wherein:
the detach efficiency stored in the nitrogen oxide detach efficiency map is a value that is pre-calculated for the nitrogen oxide storing catalytic temperature and the exhaust flow amount.

4. The control method of claim 1, wherein:
the ammonia demand amount for removing the nitrogen oxide supplied to the front side of the selective catalytic reducer is calculated by applying a stoichiometric ratio of ammonia to the nitrogen oxide.

5. The control method of claim 4, wherein:
the stoichiometric ratio of ammonia to the nitrogen oxide, which is supplied to the front side of the selective catalytic reducer, is a value that is pre-calculated by applying a selective catalytic reduction temperature, a nitrogen dioxide, and the nitrogen oxide supplied to the front side of the selective catalytic reducer.

6. The control method of claim 1, wherein:
the purify efficiency stored in the nitrogen oxide purify efficiency map is a value that is pre-calculated for an ammonia cumulative storage amount, an exhaust flow amount, a ratio of nitrogen dioxide in the nitrogen oxide exhausted from the engine to the nitrogen oxide exhausted from the engine, and a nitrogen oxide storing catalytic temperature.

7. The control method of claim 6, wherein:
the ammonia storing control value in the selective catalytic reducer is calculated by subtracting the ammonia cumulative storage amount from an ammonia target storage amount in the selective catalytic reducer.

* * * * *